United States Patent
Sleeman et al.

(10) Patent No.: US 10,605,628 B2
(45) Date of Patent: Mar. 31, 2020

(54) DISPLACEMENT SENSING APPARATUS AND METHODS

(71) Applicant: TouchNetix Limited, Fareham, Hampshire (GB)

(72) Inventors: Peter Timothy Sleeman, Fareham (GB); Stephen William Roberts, Fareham (GB)

(73) Assignee: TouchNetix Limited, Fareham (GB)

( * ) Notice: Subject to any disclaimer, the term of this patent is extended or adjusted under 35 U.S.C. 154(b) by 38 days.

(21) Appl. No.: 15/542,456

(22) PCT Filed: Jan. 4, 2016

(86) PCT No.: PCT/GB2016/050001
§ 371 (c)(1),
(2) Date: Jul. 10, 2017

(87) PCT Pub. No.: WO2016/110677
PCT Pub. Date: Jul. 14, 2016

(65) Prior Publication Data
US 2018/0274952 A1 Sep. 27, 2018

(30) Foreign Application Priority Data
Jan. 8, 2015 (GB) .................................. 1500253.8

(51) Int. Cl.
*G01D 5/241* (2006.01)

(52) U.S. Cl.
CPC ........... *G01D 5/2415* (2013.01); *G01D 5/241* (2013.01)

(58) Field of Classification Search
None
See application file for complete search history.

(56) References Cited

U.S. PATENT DOCUMENTS 4,016,466 A * 4/1977 Frappart ................. H01G 5/18
361/278
6,151,967 A * 11/2000 McIntosh .............. B81B 3/0086
361/283.4

(Continued)

OTHER PUBLICATIONS

International Search Report and Written Opinion for corresponding Patent Application No. PCT/GB2016/050001 dated Apr. 1, 2016.

(Continued)

*Primary Examiner* — Nasima Monsur
(74) *Attorney, Agent, or Firm* — Renner, Otto, Boisselle & Sklar, LLP

(57) ABSTRACT

A displacement sensor for sensing a change in separation between a first element and a second element along a displacement direction. The sensor comprises a reference electrode mounted to the second element in the form of a conductive trace on a surface of the second element facing the first element. A deformable electrode, e.g. a conductive elastomeric material, is arranged between the first element and the second element so as to overlie the reference electrode. The deformable electrode has a contact surface facing the reference electrode and insulated therefrom. At least part of the contact surface is inclined relative to an opposing surface of the reference electrode such that when the deformable electrode is compressed along the displacement direction there is a reduction in volume between the contact surface and the opposing surface of the reference electrode, thereby changing the capacitive coupling between them. The sensor further comprises a controller element configured to measure a characteristic of the capacitive coupling between the reference electrode and the deformable electrode and to determine if a change in separation between the first element and the second element has occurred be determining if there is a change in the charac- (Continued)

teristic of capacitive coupling between the reference electrode and the deformable electrode.

24 Claims, 3 Drawing Sheets

(56) References Cited

U.S. PATENT DOCUMENTS

| | | | |
|---|---|---|---|
| 6,373,265 B1 | 4/2002 | Morimoto et al. | |
| 2004/0080216 A1* | 4/2004 | Morimoto | G01L 1/142 |
| | | | 307/125 |
| 2008/0018611 A1* | 1/2008 | Serban | G06F 3/0416 |
| | | | 345/173 |
| 2011/0057904 A1* | 3/2011 | Yamano | G06F 3/0414 |
| | | | 345/174 |
| 2013/0068038 A1 | 3/2013 | Bolender et al. | |
| 2014/0267128 A1 | 9/2014 | Bulea et al. | |

OTHER PUBLICATIONS

Combined Search and Examination Report for corresponding Patent Application No. GB 1500253.8 dated Jul. 27, 2015.

* cited by examiner

DISPLACEMENT SENSING APPARATUS AND METHODS

This application is a national phase of International Application No. PCT/GB2016/050001 filed Jan. 4, 2016 and published in the English language, which claims priority to United Kingdom Patent Application No. 1500253.8 filed Jan. 8, 2015, which are hereby incorporated herein by reference in their entirety.

BACKGROUND OF THE INVENTION

The present invention relates to the field of displacement sensing, and in particular to capacitance measurement based displacement sensing, for example to detect when an object, such as a user's finger, presses on a moveable surface.

Capacitive sensing techniques have become widespread for providing touch-sensitive inputs, for example in computer tablets, mobile phones, and in many other applications. Touch sensitive input devices are generally perceived to be more aesthetically pleasing than input devices that are based on mechanical switches. Nonetheless, the present inventors have recognised there are still situations in which a user-interface that is responsive to mechanical input may be desired. In particular, the inventors have recognised there are situations in which there is a desire to measure the physical displacement of a displacement element, for example to provide the equivalent of a "click" when navigating a cursor across a display screen using a touch sensor. Furthermore, the inventors have recognised it can be desirable to provide such functionality using capacitive sensing techniques rather than mechanical switching techniques. Not only can capacitive sensing techniques provide for more reliable sensors (as they are less prone to mechanical wear), there may be situations in which displacement sensing is desired in conjunction with other sensors based on capacitive sensing (for example to measure the displacement of a capacitive touch screen), and so it can be convenient to adopt the same sensing technologies for both touch position and displacement sensing aspects.

One issue with using capacitive techniques for sensing the displacement of an element is the potential for the presence of whatever is causing the displacement, such as a user's finger, to affect the capacitance measurements in addition to the effect of the displacement itself. Another issue with known displacement sensors using capacitive sensing is a relatively high dependence on manufacturing tolerances in what can be relatively complex configurations. This is because relatively small changes in a gap between two conductors can lead to a relatively high change in their capacitive coupling (because of the reciprocal dependence on separation).

There is therefore a desire for apparatus and methods for sensing the displacement of an object relative to another object using capacitive sensing techniques which help to address some of these issues.

SUMMARY OF THE INVENTION

According to a first aspect of the invention there is provided a displacement sensor for sensing a displacement between a first element and a second element along a displacement direction, the displacement sensor comprising: a reference electrode mounted to the second element; and a deformable electrode arranged between the first element and the second element, wherein the deformable electrode has a contact surface facing the reference electrode and insulated therefrom by an insulator layer, and wherein at least part of the contact surface is inclined relative to an opposing surface of the reference electrode such that when the deformable electrode is compressed along the displacement direction there is a reduction in volume between the contact surface and the opposing surface of the reference electrode; and wherein the sensor further comprises: a controller element configured to measure a characteristic of capacitive coupling associated with the reference electrode and/or the deformable electrode and to determine a displacement between the first element and the second element from the measured characteristic of capacitive coupling.

In accordance with some embodiments the inclination of the at least part of the contact surface relative to the opposing surface of the reference electrode is provided by virtue of at least a portion of one of the contact surface and the opposing surface comprising a curved surface.

In accordance with some embodiments the deformable electrode is in the form of a strip having side walls which are substantially parallel to the displacement direction.

In accordance with some embodiments the contact surface of the deformable electrode comprises a contact portion and the deformable electrode is arranged so there is no air gap along the displacement direction between the second element and the contact portion when the displacement sensor is in its rest state with no displacement load applied.

In accordance with some embodiments the contact portion is in alignment with the reference electrode along the displacement direction.

In accordance with some embodiments the contact portion is in alignment with a contact electrode mounted to the second element along the displacement direction so as to establish an electrical connection between the contact electrode the deformable electrode.

In accordance with some embodiments the contact portion is in a middle region of the contact surface.

In accordance with some embodiments the deformable electrode is sized so as to be in compression between the first element and the second element when the displacement sensor is in its rest state with no displacement load applied.

In accordance with some embodiments the contact surface of the deformable electrode is inclined relative to the opposing surface of the reference electrode by an angle that is greater than 5 degrees and less than an angle selected from the group comprising 45 degrees, 40 degrees, 35 degrees, 30 degrees, 25 degrees, 20 degrees, 15 degrees and 10 degrees.

In accordance with some embodiments the insulator layer is provided by a surface layer on at least one of the contact surface of the deformable electrode and the opposing surface of the reference electrode.

In accordance with some embodiments the deformable electrode comprises a conductive foam material and/or a sprung metallic material and/or a flexible conductive sheath surrounding a deformable core.

In accordance with some embodiments the reference electrode comprises a conductive trace mounted to the second element.

In accordance with some embodiments the conductive trace is provided on a flexible substrate mounted to the second element.

In accordance with some embodiments the opposing surface of the reference electrode facing the deformable electrode is arranged in a varying pattern along a direction that is parallel to an axis of extent of the deformable electrode which is substantially orthogonal to the displacement direction.

In accordance with some embodiments the varying pattern comprises a zigzag pattern or a pattern of regions that vary in width in a direction substantially orthogonal to the axis of extent of the deformable electrode and the displacement direction.

In accordance with some embodiments the reference electrode and the deformable electrode are aligned with a path running around a peripheral region of the first element.

In accordance with some embodiments the reference electrode and/or the deformable electrode form a closed path.

In accordance with some embodiments the first element is movably mounted to the second element using a resiliently compressible support element.

In accordance with some embodiments the support element is provided by the deformable electrode.

In accordance with some embodiments the support element extends around a peripheral region of the first element to provide a seal for the displacement sensor.

In accordance with some embodiments the capacitive coupling for which a characteristic is measured by the controller element is a self-capacitance of one of the deformable electrode and the reference electrode while the other one of the deformable electrode and the reference electrode is connected to a reference potential.

In accordance with some embodiments the capacitive coupling for which a characteristic is measured by the controller element is a mutual-capacitance between the deformable electrode and the reference electrode.

In accordance with some embodiments one of the deformable electrode or the reference electrode comprises a first electrode part and a second electrode part, and wherein the capacitive coupling for which a characteristic is measured by the controller element is a mutual-capacitance between the first electrode part and the second electrode part while the other one of the deformable electrode and the reference electrode is connected to a reference potential.

In accordance with some embodiments the controller element is further configured to generate an output signal to indicate when it determines there has been a displacement of the displacement element relative to the reference electrode.

In accordance with some embodiments the controller element is configured to determine there has been a displacement of the displacement element relative to the reference electrode by comparing a difference between two measurements of the characteristic of capacitive coupling with a trigger threshold.

In accordance with some embodiments the displacement sensor further comprises a position-sensitive capacitive touch sensor having an electrode pattern defining a sensitive area for the position-sensitive capacitive touch sensor on the displacement element.

According to a second aspect of the invention there is provided an apparatus comprising the displacement sensor of the first aspect of the invention.

According to a third aspect of the invention there is provided a method of sensing a displacement between a first element and a second element along a displacement direction, the method comprising: providing a displacement sensor comprising a reference electrode mounted to the second element; and a deformable electrode arranged between the first element and the second element, wherein the deformable electrode has a contact surface facing the reference electrode and insulated therefrom by an insulator layer, and wherein at least part of the contact surface is inclined relative to an opposing surface of the reference electrode such that when the deformable electrode is compressed along the displacement direction there is a reduction in volume between the contact surface and the opposing surface of the reference electrode; and wherein the sensor further comprises: measuring a characteristic of capacitive coupling associated with the reference electrode and/or the deformable electrode; and determining a displacement between the first element and the second element from the measured characteristic of capacitive coupling.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

Aspects and features of certain examples and embodiments of the present invention are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Figure 1:
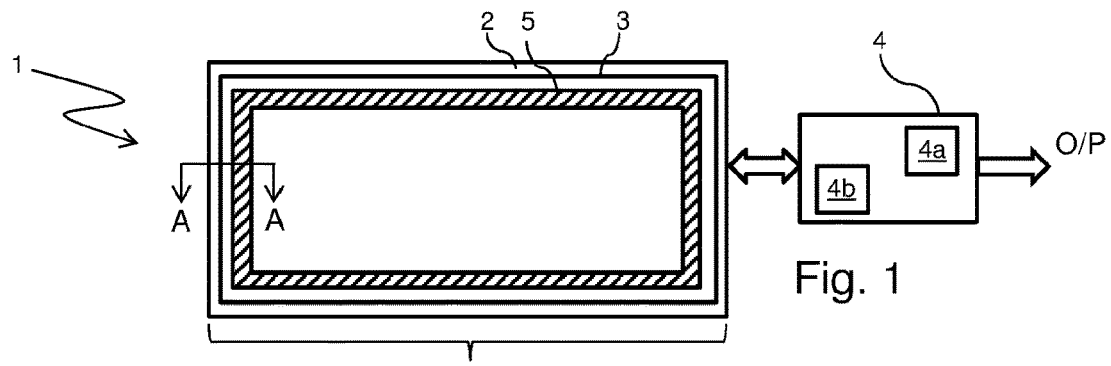
FIG. 1 schematically represents a displacement element and controller element of a displacement sensor according to certain embodiments of the invention.
Figure 2:
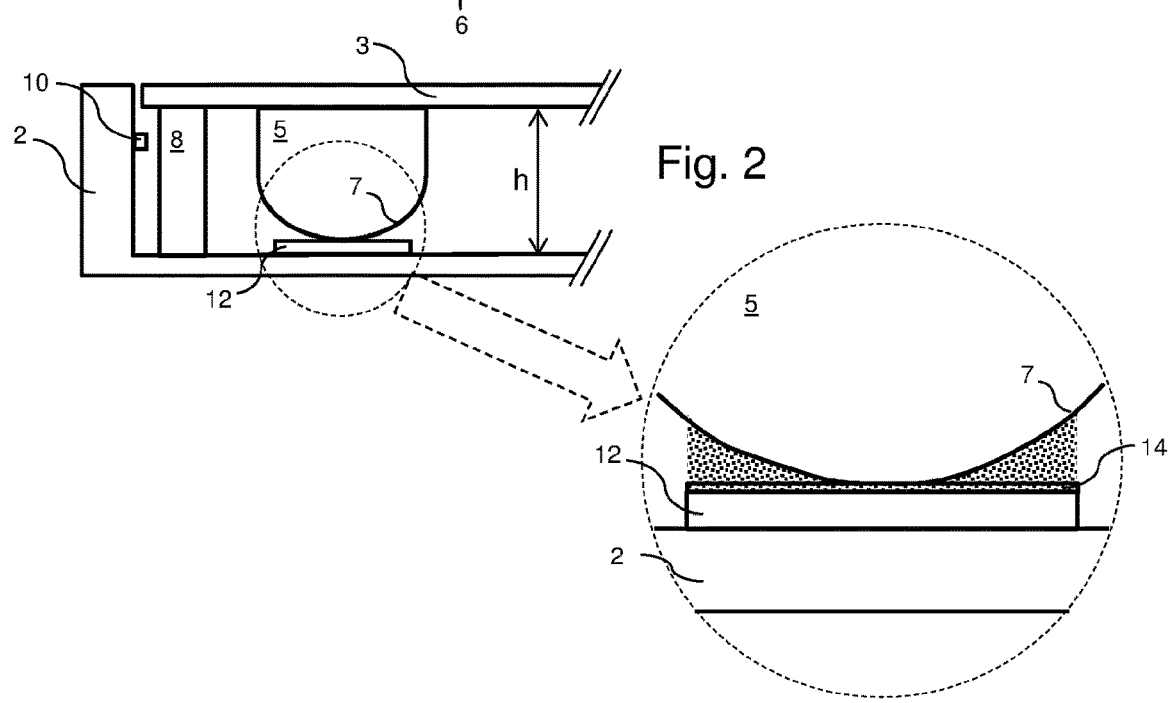
FIG. 2 schematically shows in cross-section a portion the displacement sensor of FIG. 1 in a non-displaced state.
Figure 3:
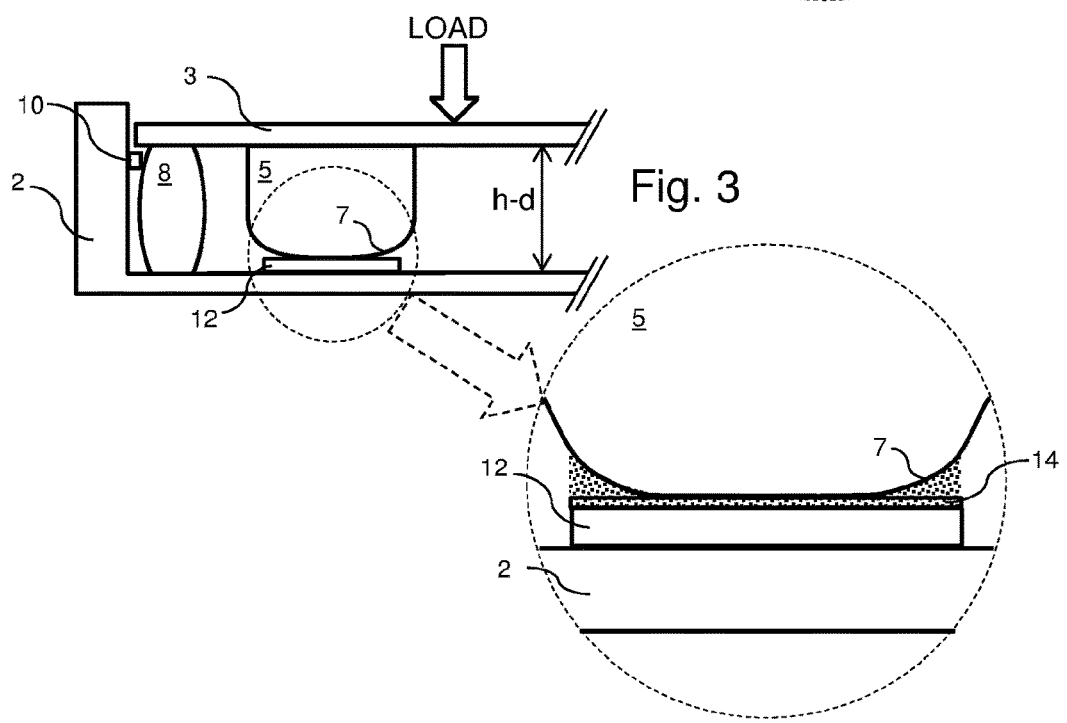
FIG. 3 schematically shows in cross-section a portion the displacement sensor of FIG. 1 in a displaced state.

FIGS. 1, 2 and 3 schematically represent various aspects of a displacement sensor 1 in accordance with certain embodiments of the invention. The displacement sensor 1 comprises two main functional parts, namely a sensor element 6 and a controller element 4. FIG. 1 schematically represents the sensor element 6 in plan view and the controller element 4 in highly schematic form (i.e. as a functional block). FIGS. 2 and 3 respectively show portions of the sensor element 6 of the displacement sensor 1 in cross-section (taken on the line A-A represented in FIG. 1), with FIG. 2 showing the sensor in a non-displaced (rest) state and FIG. 3 shows the sensor in a displaced state.

The displacement sensor 1 is arranged to measure a displacement of a first element 3 relative to a second element 2, for example in response to a user pressing on the first element 3. This is achieved by measuring changes in capacitive coupling associated with a deformable electrode 5 arranged between the first element 3 and second element 2 and a reference electrode 12, as discussed further below.

The second element 2 of the sensor element 6 may comprise part of, or be fixedly mounted to, a housing of a device in which the displacement sensor 1 is incorporated. In this context the second element 2 may for some implementations be conveniently referred to as a frame element 2. The first element 3 is movably mounted relative to the frame element 2 so that it may be moved by the application of a load along a displacement direction. In this context the first element 3 may for some implementations be conveniently referred to as a displacement element 3. However, it will be appreciated that in general it is a relative displacement between the two elements which is sensed, and in this regard the terms frame element and displacement element could equally be reversed. For example, it could be the first element 3 that is considered to be the "fixed" (frame) element with the second element 2 being considered the "movable" (displacement) element according to the specific configuration at hand.

The displacement element 3 in this example is in the form of a planar rectangle, but other shapes may be used. The size of the displacement element 3 may be chosen according to the implementation at hand to provide the desired area over which a displacement force is to be detected. Purely for the sake of a specific example, it will be assumed here the displacement element 3 has a size of around 12 cm (width)×8 cm (height)×0.3 cm (thickness). The displacement element 3 in this example is formed of a non-conductive material, for example a glass or plastic material. The displacement element 3 may be transparent or opaque according to the application at hand. For example, in some implementations a display screen may be provided below the sensor element 6. In this case the displacement element 3 (and any parts of the frame element 2 overlying the display screen) should be transparent, at least to some extent, to allow a user to see the display screen through the sensor element 6. In other cases there may be a desire from a design perspective to hide what is behind the displacement element 3 (for example because there is internal wiring or structural elements of an apparatus in which the sensor element 6 is mounted which are not intended to be visible to the user for aesthetic reasons). In this case the substrate may be opaque.

The displacement element 3 is the part of the displacement sensor 1 to which a load is applied during use (e.g. by a user pressing on the displacement element 3) to cause movement of the displacement element 3 relative to the frame element 2 (or more particularly, relative to the reference electrode 12 associated with the frame element 2, as discussed further below). It is this movement which is sensed by the displacement sensor 1. The load may be applied directly to an outer surface of the displacement element 3 or indirectly, for example, depending on whether an outer cover layer/panel is provided.

The outer surface of the displacement element 3 (i.e. the surface represented in the plan view of FIG. 1 and shown uppermost in the cross-section views of FIGS. 2 and 3) is the side of the displacement element 3 to which a load is applied during normal use. The application of an example load during use, e.g. corresponding to a user pressing a finger on the displacement element 1, is schematically shown in FIG. 3 by the arrow labelled "LOAD". For ease of explanation, the side of the displacement sensor 1 to which the load is applied in normal use may sometimes be referred to herein as the "upper" or "outer" side of the displacement sensor (or similar terminology such as "top"), with the other side being referred to as "lower" or "inner" (or similar terminology, such as "bottom"). Thus, the surface of the displacement element 3 shown uppermost in the orientation of FIGS. 2 and 3 may sometimes be referred to as the upper/outer/top surface of the substrate displacement sensor 1. Likewise, the lowermost surface of the displacement element 3 for the orientation of FIGS. 2 and 3 may sometimes be referred to as the bottom/lower/inner surface of the substrate 2. Corresponding terms may similarly be used in respect of other parts of the displacement sensor in accordance with the orientation shown in the relevant figures. However, it will be appreciated this terminology is used purely for convenience of explanation and is not intended to suggest a particular orientation of the displacement sensor 1 should be adopted in normal use. For example, although in the orientation of FIGS. 2 and 3 the upper surface of the sensor element 6 is shown uppermost, the sensor element 6 could equally be used in a downward facing configuration, or facing outwards from a vertical surface, according to the implementation at hand. More generally, the displacement sensor may be incorporated in a portable apparatus (such as a tablet computer or mobile telephone), and in that case the orientation in use will vary according to how a user happens to be holding the apparatus.

The frame element 2 provides a structural support for the displacement element 3 and will typically be connected to, or comprise an integral part of, an apparatus in which the displacement sensor 1 is provided. The frame element 2 may comprise any suitable structural material, for example it may be formed from metal or plastic. The frame element 2 in this example defines a recess/opening into which the displacement element 3 is received and moveably supported therein by a support element 8 arranged around a peripheral part of the displacement element. In this example the movable mounting of the displacement element 3 relative to the frame element 2 is provided by virtue of the support element 8 comprising a resiliently compressible material. An upper edge of the support element 8 is bonded to the underside of the displacement element 3 and a lower edge of the support element 8 is bonded to the frame element 2. Conventional bonding techniques can be used for bonding the support element 8 to the other parts of the displacement sensor, for example having regard to bonding techniques appropriate for the materials involved.

The support element 8 in this example is thus generally in the form of a rectangular ring arranged around a peripheral part of the displacement element 3. The support element 8 has a generally rectangular cross-section when in its relaxed state (as shown in FIG. 2), although when the support element 8 is compressed by virtue of a load being applied to the displacement element 3, its sides may bow out to accommodate the movement, as schematically indicated in FIG. 3. It will, however, be appreciated that other shapes could be used in accordance with established mounting practices. For example, more complex shapes for the support element 8 may be chosen to provide different degrees of compressibility according to the degree to which the support element is already compressed. The displacement element 6 may be provided with a stop 10 to limit the extent to which the support element 8 may be compressed (i.e. to limit the extent to which the displacement element may be displaced relative to the frame element 2). In this example such a stop is provided by a suitably arranged protrusion 10 from a side wall of the recess defined by the frame element 2. This protrusion may extend all around the recess or may be provided at a number of discrete locations around the recess.

In this example implementation the support element 8 also functions as a sealing gasket and so forms a closed loop around the whole periphery of the displacement element 3. However, it will be appreciated the support element 8 need not be a single component extending all around the sensor element, but may comprise a number of separate components, for example a number of separate support pillars arranged around the displacement sensor with one at each corner of the displacement layer 3. It will also be appreciated that other configurations may be used for the resiliently compressible support element 8, for example, the support element may comprise one or more springs.

The support element 8 in this example comprises an elastomeric material having an appropriate degree of rigidity and compressibility according to the application at hand (i.e. providing a desired level of resistance to compression). In some cases there may be a desire for a material having relatively low compressibility, thereby requiring a relatively high load to generate a given displacement of the displacement element 3 relative to the frame element 2. Conversely, in some cases there may be a desire for a material having relatively high compressibility, thereby requiring a relatively low load to generate a given displacement of the displacement element 3 relative to the frame element 2. This will be a question of design choice. For example, in the context of displacement sensor forming a user interface a designer may choose how hard the user must press to cause a given displacement. This may be done, for example, to balance the risk of accidental activation against requiring too great a force for activation. A material having the desired degree of compressibility may be selected from modelling or empirical testing, for example.

The recess provided in the frame element 2 is arranged in this example so the upper surface of the displacement element 3 broadly aligns with the upper surface of that part of the frame element 2 surrounding the displacement element 3 (with a gap therebetween to allow for the relative movement), to give the general impression of a continuous outer surface for the apparatus in which the displacement sensor 1 is incorporated. If desired, a flexible seal may be provided to cover the gap between the displacement element 3 and the surrounding surface of the frame element 2. More generally, it will be appreciated there are various structural configurations whereby a frame element may be arranged to support a displacement element 3 in such a way that the displacement element and frame element are movable relative to one another in accordance with established manufacturing techniques.

The frame element 2 may extend under the entire area of the displacement element 3 or may have an opening in a central portion, for example to accommodate a display screen. In cases where the displacement element 3 overlies a display screen, the display screen may be mounted to the displacement element 3, so that it moves with it, or may be mounted to the frame element 2, so that it does not move with the displacement element 3.

The deformable electrode 5 between the displacement element 3 and the frame element 2 follows a generally rectangular path around (i.e. within and adjacent to) a peripheral region of the displacement element 3 and has a generally "D" shaped cross-section. Thus, the deformable electrode 5 comprises an upper flat surface which abuts the lower surface of the displacement element 3 (and may be bonded thereto), two side walls which are generally aligned with the direction along with displacements are to be sensed (i.e. vertical for the orientation represented in FIGS. 2 and 3), and a lower curved wall 7, which may also be referred to as a contact surface 7 for the deformable electrode 5. In this particular example the deformable electrode 5 forms a substantially closed path (i.e. closed or nearly closed) around the entire periphery of the substrate and has approximately the same height and width in cross-section, for example around 0.5 cm. The deformable electrode 5 in this example follows a path that is around 1 cm from the peripheral edge of the displacement element. However, it will be appreciated the specific geometry of the deformable electrode, e.g. in terms of its cross-sectional size, separation from the peripheral edge of the displacement element 3, and the extent to which it extends around the whole periphery, may be different in different implementations.

The deformable electrode may be formed in any of a number of different ways. In this example the deformable electrode comprises a suitably profiled elastomeric conductive foam that may be provided in accordance with conventional techniques for forming conductive foam products. However, in other examples other configurations may be adopted, for example the deformable electrode may comprise a sprung metal structure or may be formed by a flexible conductive sheath, for example a web of metallic wires, surrounding a compliant core, for example a rubber/silicone core or an air chamber.

An electrical connection to the deformable electrode 8 to allow for the measurements discussed further below may be provided in various ways. For example, one or more conductors, such as wires, may be embedded in the deformable electrode 8 and connected back to external circuitry, or a surface of the deformable electrode may abut one or more electrical contact pads that are connected back to external circuitry with appropriate wiring.

Between the deformable electrode 5 and the frame element 2 is a reference electrode 12. The reference electrode is generally in alignment with the deformable electrode and follows a corresponding path beneath the deformable electrode. An upper surface of the reference electrode 12 is provided with an electrical insulator layer 14 (shown schematically in the magnified parts of FIGS. 2 and 3). The insulator layer prevents the overlying deformable electrode 5 from coming into direct electrical contact with the reference electrode 12 when the deformable electrode 12 is pressed against the reference electrode 12 during displacement of the displacement element 3 towards the frame element 2.

The reference electrode 12 may be provided in a number of different ways. In this example the reference electrode is provided by a conductive trace deposited on the frame element 2, for example a copper foil bonded to the frame element 2, and having a width broadly corresponding to that of the deformable electrode, for example around 0.5 cm. The insulator layer 14 may also be provided in a conventional manner, for example comprising a plastic film or layer of plastic/resin encapsulant over the reference electrode 12. It will, however, be appreciated that different techniques can be used in different implementations. For example the reference electrode could be provided as a structurally distinct element, for example comprising a conductive trace mounted to a printed circuit board, such as a flexible printed circuit board, arranged at the appropriate location between the deformable electrode 5 and the frame element 2. Also, the reference electrode need not comprise a conductive trace, and may instead comprise wiring that provides conductivity over a broadly corresponding area, for example using a plurality interconnected parallel wires and/or a mesh of wires provided under the deformable electrode 5. Although the reference electrode 12 is schematically represented in FIGS. 2 and 3 as being disposed on top of the frame element 2 in other examples the reference electrode may be embedded within the frame element 2. If the frame element 2 is conductive, the reference electrode 12 may be insulated therefrom. It will be appreciated the reference electrode 12 and insulator layer 14 might typically be relatively thin compared to the other elements of the sensor element 6 shown in FIGS. 2 and 3, but these figures are not drawn to scale with the reference electrode 12 (and its layer of insulation 14) shown with exaggerated thickness in the cross-sections of FIGS. 2 and 3 for ease of representation.

FIG. 2 schematically represents the sensor element 6 in a rest state with no displacement load applied to the displacement element 3. In this example the gap between the upper surface of the frame element 2 and a lower surface of the displacement element 3 is, as indicated in FIG. 2, h. This gap h corresponds with the height of the support element 8 in its relaxed state. In this example the support element 8 is sized to provide a gap h that is a little under 0.5 cm, for example 0.4 cm. As noted above, the deformable electrode 5 in this example has a height of around 0.5 cm, and therefore is maintained under slight compression when the displacement element 3 is bonded to the frame element 2 via the support element 8. Providing the deformable electrode 5 under slight compression can help to accommodate variations in the geometry of the displacement sensor arising from manufacturing tolerances. Thus, and as can be seen in particular in the magnified part of FIG. 2 shown in the dashed circle, the lowest part of the contact surface 7 of the deformable electrode 5 is biased into contact with the insulator layer 14 overlying the reference electrode 12. Thus, there is a portion of the contact surface 7 for which there is no free space (air gap) gap between the deformable electrode 5 and the frame element 2, even when in the rest (non-displaced) state.

FIG. 3 schematically represents the sensor element 6 in a displaced state in which a displacement load is applied to the displacement element 3, as schematically indicated by the arrow labelled LOAD. The displacement load may, for example, be provided by a user's finger pressing on the outer surface of the displacement element 3. The support element 8 and the deformable electrode 5 are both compressed under the action of the displacement load allowing the displacement element 3 to move along a displacement direction towards the frame element 2 by an amount d. The magnitude of the displacement d will be a function of the force (load) applied and the combined resilience of the support element 8 and the deformable electrode 5. The displacement element 3 in FIG. 3 is schematically shown as remaining parallel when displaced, but in general it may be expected the displacement element 3 may be tilted depending on the location of the load (i.e. the value of d may be different at different positions across the displacement element 3). In this example the magnitude of the displacement d is assumed to be around 0.1 cm.

As a consequence of the deformable electrode 5 being squashed under the displacement load, the curved contact surface 7 is pressed harder against the underlying insulator layer 14. This causes the contact surface 7 to flatten against the insulator layer 14, thereby reducing the overall volume between the deformable electrode 5 and the reference electrode 12 as compared to the rest state represented in FIG. 2. The space between the deformable electrode 5 and the reference electrode 12 is schematically shown with shading in FIGS. 2 and 3, and it can be seen how the shading in FIG. 3 occupies a smaller area than the shading in FIG. 2.

Because the volume of the space between the deformable electrode 5 and the reference electrode 12 is reduced under the displacement load, the capacitive coupling between the deformable electrode 5 and the reference electrode 12 increases when the displacement load is applied. The controller element 4 is configured to measure a characteristic of the capacitive coupling associated the two electrodes, thereby allowing a determination as to whether a displacement has occurred to be made. As discussed further below, there are various different ways in which a characteristic of the capacitive coupling between the two electrodes can be measured. For example, the mutual capacitive coupling between the two electrodes could be measured by applying a drive signal to one of the electrodes and measuring the extent to which the drive signal is coupled to the other of the electrodes. Alternatively, the self-capacitance of one of the electrodes could be measured with respect to a reference potential whilst the other electrode is connected to the reference potential (e.g. a system ground or other system reference potential). In yet another example, one of the electrodes may comprise two components which are capacitively coupled to one another. For example the reference electrode 12 of FIGS. 1 to 3 may be replaced with a reference electrode comprising a pair of parallel or inter-digitated conductors which are insulated from one another but in a relatively close proximity on the frame element 2, with the gap between them underlying the deformable electrode 5. The mutual capacitive coupling between the two conductors comprising the reference electrode could be measured by applying a drive signal to one of the conductors and measuring the extent to which the drive signal is coupled to the other of the conductors. The component of the drive signal coupled between the electrodes will generally be reduced as the overlying deformable electrode is compressed on to them under the displacement load.

Thus, having described the structural configuration of some displacement sensors in accordance with certain embodiments of the invention, the operation of an example displacement sensor will be described with regard to the functionality provided by the control element 4.

The controller element 4 comprises capacitance measuring circuitry 4a and processing circuitry 4b. The capacitance measuring circuitry 4a is configured to measure a capacitance characteristic associated with the electrodes 5, 12 comprising the displacement sensor (e.g. a measure of the mutual capacitance between them or the self-capacitance of one of them). The processing circuitry 4b of the control element 4 is configured to determine a displacement of the displacement element 3 relative to the frame element 2 from the measurements of the capacitance characteristic, for example with a change in the measured capacitance characteristic being taken to indicate a change in displacement.

The controller element 4 comprises circuitry which is suitably configured/programmed to provide the functionality described herein using conventional programming/configuration techniques for capacitive sensors. The capacitance measuring circuitry 4a and signal processing circuitry 4b are schematically shown in the figures as separate elements for ease of representation. However, it will be appreciated that the functionality of these components can be provided in various different ways, for example using a single suitably programmed general purpose computer, or field programmable gate array, or suitably configured application-specific integrated circuit(s)/circuitry or using a plurality of discrete circuitry/processing elements for providing different elements of the desired functionality.

The capacitance measurement circuitry 4a may coupled to the deformable electrode 5 and the reference electrode 12 in different ways according to different embodiments, as mentioned above and discussed further below. Connections between the capacitance measurement circuitry and the respective electrodes can be established in accordance with conventional techniques, for example using appropriate wiring. In some example embodiments the electrodes may be connected to a reference potential, e.g. a system ground/earth potential, or other reference potential. Again these connections can be established using conventional techniques. In principle connections to the reference potential could be made via the capacitance measurement circuitry in the control element 4, but could also be made directly and independently from the capacitance measurement circuitry (for example by connecting directly to a chassis of an apparatus in which the displacement sensor is provided and which is maintained at the relevant reference potential). For simplicity the system reference potential may sometimes be referred to herein as a system ground or earth, but it will be appreciated the actual potential itself may be arbitrary and is not significant (e.g. it could be 0V, 5V or 12V, or any other value according to the implementation at hand)

The capacitance measurement circuitry 4a may operate to measure the relevant capacitance characteristic of the electrodes in accordance with any conventional techniques, and as already mentioned, the capacitance measurement circuitry 4a may be configured to measure a self-capacitance of one or other electrode or a mutual-capacitance between them, or between different parts of one of the electrodes. The textbook "Capacitive Sensors: Design and Applications" by Larry K. Baxter, August 1996, Wiley-IEEE Press, ISBN: 978-0-7803-5351-0 [1] summarises some of the principles of conventional capacitive sensing techniques that may be used for measuring a capacitance characteristic in accordance with embodiments of the invention. More generally, any established techniques for measuring a degree of capacitive coupling could be adopted.

In accordance with a first embodiment the capacitance measurement circuitry 4a may be configured to measure a self-capacitance of the reference electrode 12 while the deformable electrode 5 is connected to a system reference potential. In accordance with conventional techniques, measuring the self-capacitance of the reference electrode 12 may be performed by applying a drive signal to the reference electrode 12 that varies in time relative to system ground (or other reference potential) and determining the extent to which the drive signal is capacitively coupled to system ground via conductive paths in the vicinity of the reference electrode that are connected to the system ground potential. For arrangements in accordance with embodiments of the invention such as represented in FIGS. 1 to 3, the presence of the deformable electrode 5 provides a major contribution to the extent to which the reference electrode 12 is capacitively coupled to the reference potential. Furthermore, the magnitude of this capacitive coupling depends on the separation (offset) between the different parts of the reference electrode 12 and the deformable electrode 5. Consequently, the magnitude of the capacitive coupling between the two electrodes depends on the volume between them. Therefore, this self-capacitance of the reference electrode 12 changes when the displacement element 3 is displaced under load thereby compressing the deformable electrode 5 towards the reference electrode 12. The processing circuit 4b is configured to receive indications of the measured capacitance characteristic of the reference electrode from the capacitance measurement circuitry 4a and determine a displacement of the displacement element 3 relative to the frame element 2 (more particularly relative to the reference electrode 12) in response thereto.

In some cases the processing circuitry 4b may be configured to determine an absolute value for a displacement, for example by converting an individual capacitance measurement (or average of several capacitance measurements) to a displacement offset based on a calibration function. The calibration function may, for example, be based on modelling or established in an initial setup procedure in accordance with conventional capacitance measurement techniques. In particular, a baseline value (corresponding to a measurement of the relevant capacitance characteristic of the second electrode when there is no displacement) may be established at various times, for example when the displacement sensor is initially turned on. The calibration function may then be used to convert differences in capacitance measurement from the baseline measurement to corresponding displacements.

In other cases, the processing circuitry may be configured to in effect provide a binary indication as to whether or not there has been a displacement greater than a threshold displacement. For example, the processing circuitry may be configured to identify when there has been a change in measured capacitance that is greater than a pre-defined trigger threshold, and to determine that this corresponds with a displacement by more than an amount corresponding to the pre-defined threshold displacement. An appropriate value for the pre-defined trigger threshold in any given implementation can be established empirically having regard to the extent of displacement which is desired to trigger a determination that displaced has occurred, and may be dynamically chosen to suit a given application.

The processing circuitry 4b may further be configured to provide an output signal ("O/P") indicating the status regarding the displacement determination. This may be provided, for example, to a controller of a host apparatus in which the displacement sensor 1 is arranged. It will be appreciated the response of the host apparatus to the output from the controller element 4 is purely an implementation matter and will depend on the reason why the displacement is being sensed in any given application. That is to say, it is not significant to the principles of displacement sensing as described herein why the displacement is being sensed.

It will be appreciated a self-capacitance approach such as described above could similarly be adopted with the capacitance measurement circuitry 4a instead configured to measure a self-capacitance of the deformable electrode 5 while the reference electrode 12 is connected to a system reference potential. That is to say, the connections to the deformable electrode 5 and the reference electrode 12 could simply be reversed (the self-capacitance of the deformable electrode 5 will equally be affected by the change in separation between the two electrodes). In general, it may be preferable for whichever of the two electrodes is on the side of the displacement element 6 from which the load is normally applied in use to be the one connected to the system reference potential. This is to help reduce any effect that an approaching object, such as a user's finger, might have on the self-capacitance measurement. In effect, the electrode which is connected to the reference potential may be used to help "screen" the other electrode for which the self-capacitance measurement is made from an approaching object, thereby reducing the chance of an approaching object giving rise to a change in measured self-capacitance that leads to a false-determination of displacement being made. In situations where there is considered to be a high risk of such false-determinations being made, further screening can be applied. For example, a grounded plane may be provided on the upper surface of the displacement element 3.

In accordance with a second embodiment the capacitance measurement circuitry 4a may be based on a mutual-capacitance measurement approach. In this configuration, the capacitance measurement circuitry may be configured to apply a time-varying drive signal to the deformable electrode 5 and to measure the extent to which the drive signal is capacitively coupled to the reference electrode 12, again using conventional capacitance measurement techniques. The magnitude of the mutual capacitive coupling between the electrodes depends on the separation between the different parts of the reference electrode 12 and the deformable electrode 5, which were integrated over the electrodes corresponds with the volume between them. Thus the mutual-capacitance between the reference electrode 12 and the deformable electrode 5 changes when the deformable electrode 5 is compressed towards the reference electrode 12 under the application of a displacement load to the displacement elements 3. The processing circuitry 4b may be configured to receive and process measurements from the capacitance circuitry 4a in accordance with this mutual-capacitance based example embodiment in the same manner as described above for the self-capacitance based example embodiment.

It will be appreciated a mutual-capacitance based approach such as described above could similarly be adopted with the capacitance measurement circuitry 4a instead configured to apply a time-varying drive signal to the reference electrode 12 and to measure the extent to which the drive signal is capacitively coupled to the deformable electrode 5. That is to say, the connections between the capacitance measurement circuitry and the two electrodes could in effect be reversed. In a corresponding manner to that described above for a self-capacitance approach, in general, it may be preferable for whichever of the two electrodes is on the side of the displacement element 6 from which the load is normally applied in use to be the one connected to the drive signal. This can again help reduce any effect that an approaching object, such as a user's finger, might have on the mutual-capacitance measurement. In situations where there is considered to be a high risk of such false-determinations being made, additional guarding/shielding can be applied. For example, a planar guard electrode may be provided on the upper surface of the displacement element 3 to cover the under-lying deformable electrode 5 and the reference electrode 12, and the drive signal applied to the relevant one of the deformable electrode and reference electrode may also be applied to the guard electrode.

It will be appreciated there are various further combinations with regards to how the capacitance measurement circuitry may be coupled to the electrodes of the displacement element 6. For example, in some other implementations, a displacement sensor may have a generally similar structural configuration to that described above, but the reference electrode 12 may in effect be split into a first part and a second part having a capacitive coupling between them. Capacitance measurement circuitry may then be configured to measure the extent to which a drive signal applied to the first part is coupled to the second part of the reference electrode while the deformable electrode 5 is connected to a system reference potential. The extent to which the drive signal is coupled from the first part to the second part of the reference electrode will be affected by the proximity of the deformable electrode. The measurements of capacitive coupling between the first and second parts of the reference electrode can again be made using conventional capacitance measurement techniques. This style of mutual capacitance measurement may sometimes referred to as a "transverse" arrangement in recognition of the fact the coupled electric fields between the two parts of the split reference electrode are generally oriented in a transverse manner relative to their supporting substrate (i.e. the frame element 2 in this example).

In principle, and as with the other embodiments, the functionality of the reference electrode 12 and the deformable electrode 5 could again be reversed in so far as they are connected to the external measurement circuitry/reference potential. That is to say, in some examples the deformable electrode 5 may be at the electrode which is divided into two (or more) parts (conductors) between which the mutual capacitive coupling is measured while the reference electrode is connected to a system reference potential. However, in practice such a configuration is likely to be more structurally complex than a configuration in which it is the fixed reference electrode that is split into multiple parts.

Thus, and as will be understood by those skilled in the art, there are various different ways in which the electrodes can be driven to measure different characteristics associated with the degree of capacitive coupling between the deformable electrode 5 and the reference electrode 12. Any of these approaches may be used for determining a displacement of the displacement element 3 with respect to the frame elements 2 through the effect the subsequent distortion of the deformable electrode 5 has on its capacitive coupling to the reference electrode 12. In some cases the measured characteristic of capacitive coupling may directly relate to the mutual capacitive coupling between the two electrodes, whereas in other cases the measured characteristic may be something which is not in itself a direct measure of the capacitive coupling between the electrodes, but is something which is affected by changes in the capacitive coupling between the two electrodes, for example the self-capacitance of one or other of the electrodes or the mutual-capacitance between two or more components of one of the electrodes.

Figure 4A:
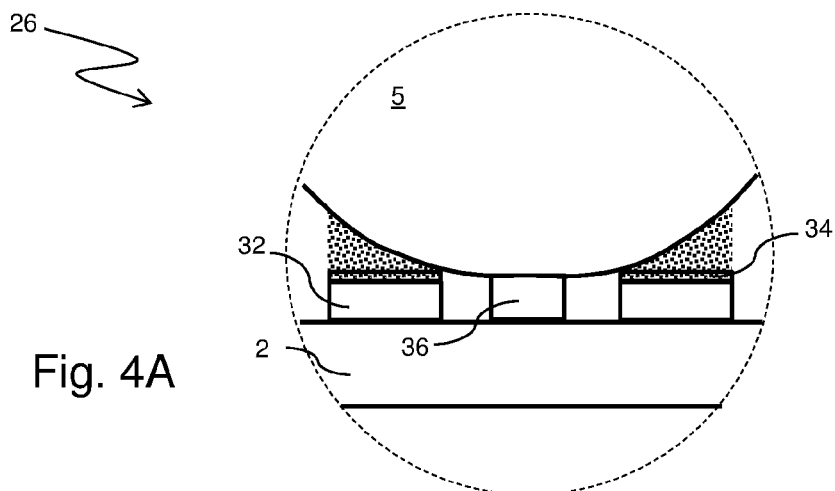
FIGS. 4A and 4B schematically show a portion of a displacement sensor according to certain other embodiments of the invention in a non-displaced state in FIG. 4A and a displaced state in FIG. 4B.
Figure 4B:
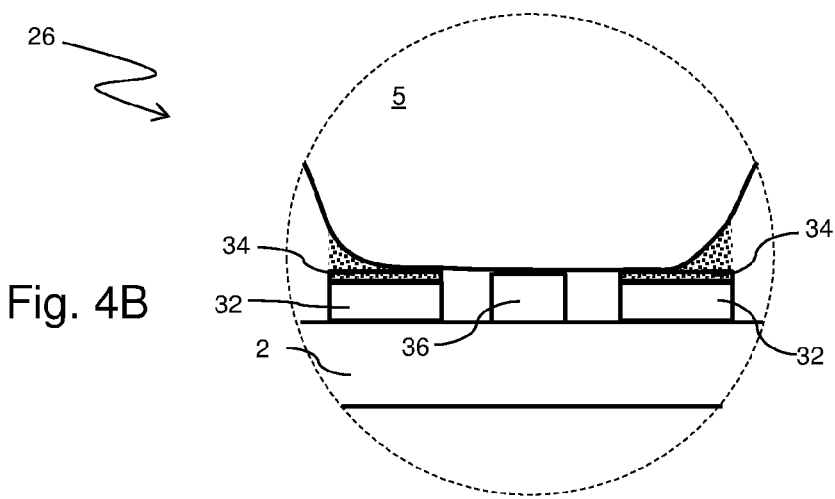

FIGS. 4A and 4B schematically represent a magnified portion of a sensor element 26 in accordance with certain other embodiments of the invention. FIG. 2 schematically represents the sensor element 26 in a rest state while FIG. 3 schematically represents the sensor element 26 in a displaced state in which a displacement load is applied. In this regard, FIGS. 4A and 4B are similar to, and will be understood from, the magnified portions of the sensor element 6 represented in FIGS. 2 and 3 respectively. However, the sensor element 26 represented in FIGS. 4A and 4B differs from the sensor element 6 represented in FIGS. 1 to 3 in the specific configuration of its reference electrode and the manner in which electrical contact is established to the deformable electrode 5. Apart from these differences, the displacement sensors of FIGS. 1 to 3 and FIGS. 4A and 4B may otherwise be the same with corresponding elements in each being identified by corresponding reference numerals.

Thus, whereas the reference electrode 12 represented in the sensor element 6 FIG. 2 is in the form of a single trace extending under the deformable electrode 5 and having a broadly corresponding width, the displacement sensor 26 of FIGS. 4A and 4B comprises a reference electrode 32 comprising two traces which are interconnected and which are arranged on either side of a central contact electrode 36. The respective traces comprising the reference electrode 32 may be formed in the same manner as discussed above, and they also comprise an insulating layer 34 preventing the components of the reference electrode 32 from establishing direct electrical contact with the overlying deformable electrode 5. In effect, the reference electrode 32 of FIGS. 4A and 4B may be considered to correspond closely with the reference electrode 12 of FIGS. 2 and 3, except for having a gap in the middle running around the length of the reference electrode and in which the contact electrode 36 is arranged.

Unlike the reference electrode 32, the contact electrode 36 is not provided with an insulating layer. Therefore, the deformable electrode 5 is in electrical contact with the contact electrode 36. In this regard to the contact electrode 36 provides a manner for connecting the deformable electrode to external circuitry, for example so as to apply a drive signal to the deformable electrode 5, or to connect the deformable electrode at a system reference potential.

Apart from these differences, a displacement sensor based on the sensor element 26 represented in FIGS. 4A and 4B may otherwise operate in the same manner as described above for the displacement element 6 represented in FIGS. 2 and 3. That is to say, when the displacement element 3 is compressed (squashed) under the application of a displacement load, the volume of space between the deformable electrode and the underlying reference electrode (shown with shading in FIGS. 4A and 4B) is reduced, which, as mentioned above, changes the capacitive coupling between them. Thus, by measuring a characteristic of the capacitive coupling between the deformable electrode 5 and the reference electrode 32, the occurrence of a displacement can again be identified.

Figure 5:
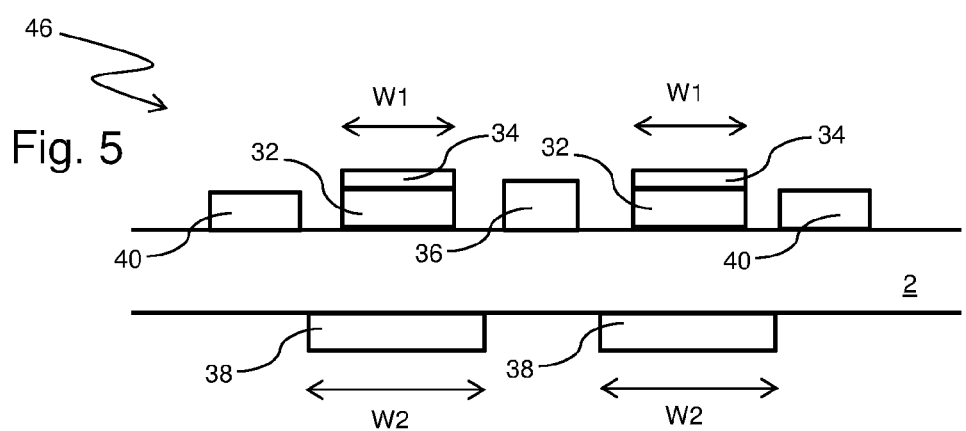
FIG. 5 schematically shows an electrode arrangement of a displacement sensor according to certain other embodiments of the invention.

FIG. 5 schematically represents a portion of a sensor element 46 in accordance with certain other embodiments of the invention. The sensor element 46 represented in FIG. 5 is similar to, and will be understood from, the sensor element 26 represented in FIGS. 4A and 4B. However, the sensor element 46 represented in FIG. 5 differs from the sensor element 26 represented in FIGS. 4A and 4B in additionally containing shield/guard electrodes 38, 40. Apart from this difference, a displacement sensor comprising the sensor element 46 of FIG. 5 may operate in broadly the same manner as a displacement sensor comprising the displacement element 26 of FIGS. 4A and 4B with corresponding elements in each being identified by corresponding reference numerals.

The shield electrodes 38, 40 may be used in accordance with broadly conventional techniques to reduce the sensitivity of the measured characteristic of capacitive coupling to external influences, for example resulting from an approaching object which gives rise to the measured displacement. In the example of FIG. 5, there is a shield electrode 38 placed beneath each part of the reference electrode 32 on an opposing side of the frame element 2 (and having a width W2 greater than the width W1 of the overlying part of the reference electrode 32), and also a shield electrode 40 placed adjacent to each part of the reference electrode 32 on the same side of the frame element (the opposite side to the contact electrode 36). These shield electrodes 38, 40 running under and/or around the reference electrode 32 may be driven in the same way as the reference electrode 32, thereby reducing the apparent capacitive coupling of the reference electrode 32 to other elements of the displacement sensor 1 (i.e. what might be termed parasitic capacitance). This can help sensitivity to what might be relatively small changes in capacitive coupling caused by displacement of the displacement element. It will be appreciated that similar shield/guard electrodes can be provided for all embodiments, and furthermore that some embodiments may only use shield/guard electrodes below the reference electrode or around the reference electrode, rather than using both.

Figure 6:
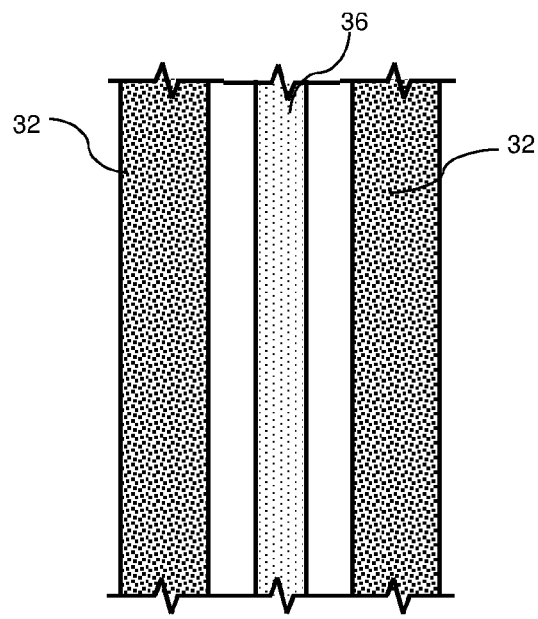
FIG. 6 schematically shows a part of the displacement sensor of FIG. 1 in plan view.
Figure 7A:
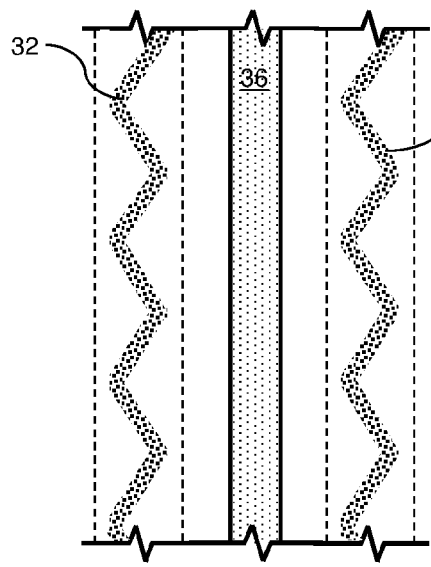
FIGS. 7A and 7B schematically show parts of displacement sensors according to certain other embodiments of the invention in plan view.
Figure 7B:
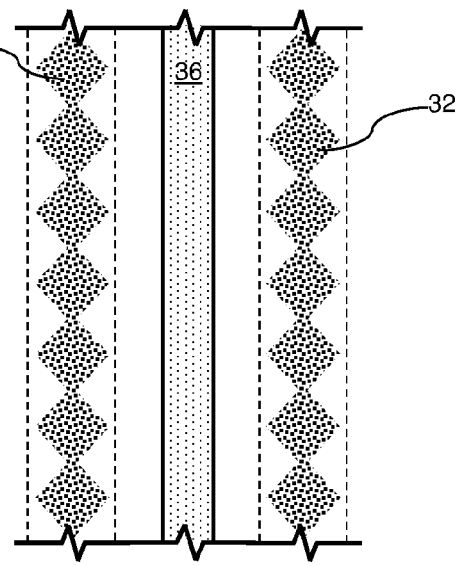

FIG. 6 schematically shows in plan view (i.e. along a view direction which is parallel to the displacement direction) portions of the reference electrode 32 and contact electrode 36 of the displacement element 26 represented in FIGS. 4A and 4B. As discussed above, the respective portions of the reference electrode 32 comprise traces of uniform width. However, in accordance with other embodiments, such as schematically represented in FIGS. 7A and 7B, the reference electrode 32 might comprise a more complex pattern. For example, the respective components of the reference electrode 32 in the example represented in FIG. 7A follow a generally zigzag pattern, whilst the reference electrodes 32 in the example represented in FIG. 7B follow a pattern of interconnected diamonds. More generally, surface(s) of the reference electrode(s) facing the deformable electrode may be arranged in a varying pattern along a direction that is parallel to an axis of general extent of the reference electrode (and the overlying deformable electrode) which is substantially orthogonal to the displacement direction. This approach may be adopted to increase the relative change in capacitive coupling caused by deformation of the deformable electrode 5 as compared to the rest state capacitive coupling between them, thereby increasing overall sensitivity.

In the examples discussed above, the contact surface 7 of the deformable electrode 5 is generally in the form of a curved surface. However, in other examples a linear surface could be used, for example a wide "V" shape, or a simple incline across the whole lower surface, could be used. What is significant in accordance with certain embodiments is that in the rest state a part of the deformable electrode may rest against another part of the displacement sensor which is fixed in position relative to the reference electrodes (e.g. a part of the deformable electrode may be in contact the insulator layer overlying the reference electrode and/or a contact electrode). By providing this rest-state contact in conjunction with a deformable electrode, the lower surface of the deformable electrode facing the reference electrode may be easily located in a readily repeatable position relative to the reference electrode, thereby reducing sensitivity to manufacturing tolerances.

In accordance with certain embodiments, the contact surface of the deformable electrode is inclined relative to the opposing surface of the reference electrode by an angle that is greater than 5 degrees and less than an angle selected from the group comprising 45 degrees, 40 degrees, 35 degrees, 30 degrees, 25 degrees, 20 degrees, 15 degrees and 10 degrees. These kinds of values can be expected to provide suitable levels of performance. In some respects, the shallower the angle the greater the sensitivity to displacements as the reduction in the volume between the electrodes relative to the rest state volume between the electrodes will be greater for a given magnitude of displacement. However, in some cases a steeper angle may be preferred to provide sensitivity to a wider range of displacement magnitudes.

It will be appreciated there are various modifications to the approaches described above that can be adopted in accordance with other embodiments of the invention.

For example, whereas the insulator layers discussed above have been provided on the surface of the reference electrode, an insulator layer could instead, or in addition, be provided on the deformable electrode.

Furthermore, whereas the above-described embodiments have focused on an arrangement in which the reference electrode is underneath the deformable electrode from the point of view of the direction from which the load is applied, in another configuration the reference electrode could be on top of the deformable electrode (i.e. on the same side as that from which the load is applied). For example, the reference electrode 12 may be provided on an underside of the displacement element 3 in a configuration that is otherwise in accordance with represented that in FIGS. 1 to 3.

Furthermore still, whereas in the above described embodiments the information between the contact surface of the deformable electrode 5 and the reference electrode 12 is provided by a degree of curvature in the service of the deformable electrode 5, the same effect can be achieved by instead having the reference electrode inclined relative to a surface of the deformable electrode that is flat and perpendicular to the displacement direction.

It will also be appreciated the displacement sensor may be provided with additional functionality. For example, in some cases the displacement element 3 could be provided with a conventional capacitive touch-panel sensor. This may, for example, be provided using a suitably arranged electrode pattern deposited on the outer surface and/or on the inner surface of the displacement element 3. The electrode pattern for the touch-panel aspect may be provided in accordance with conventional techniques. Furthermore, the touch-panel component may also overlay a display (in cases where the various elements overlying the display are transparent). Thus, a capacitive touchscreen featuring displacement sensing can be provided.

It will also be appreciated that in the approaches described above the deformable and reference electrodes each comprise a single continuous electrode associated with a single measurement channel of the of the control circuitry (or reference potential). Nonetheless, the respective electrodes can in principle be divided into multiple parts with separate connections to the control circuitry and/or reference potential. For example, one or other, or both, electrodes could comprise two separate parts which together extend around a portion (e.g. a major portion, such as more than 50%) of the outer periphery of the displacement sensor, and each part may be connected to a separate capacitive characteristic measurement channel (or in parallel or multiplexed manner to a single capacitance characteristic measurement channel), with the outputs from the separate measurement channels being combined to provide an indication of the combined capacitive characteristics of the different parts forming the second electrode. In another implementation in which one or other (or both) of the respective electrodes are divided into multiple parts, the multiple parts of each electrode could be simply be connected together in parallel to a single measurement channel.

It will further be appreciated that there can be various modifications made to the specific geometries discussed above. For example, different shapes of displacement element may be adopted for different implementations. For example, whereas FIG. 1 shows a rectangular displacement element by way of an example, the displacement element could in general adopt any desired shape, for example a circular or irregular shape.

It will further be appreciated the electrodes may have different shapes in cross-section in different implementations. For example, whereas some of the above-described embodiments have primarily focused on a deformable electrode having a generally D-shaped cross section, in other embodiments other shapes may be adopted. For example, in some implementations the deformable electrode may be generally circular in cross-section. More generally, the deformable electrode may adopt any shape that provides an appropriately-inclined portion of the deformable electrode surface relative to a facing part of the reference electrode so that the surface of the deformable electrode may be progressively squashed/compresses towards the reference electrode when a displacement load is applied so as to reduce the volume of space between them.

In the embodiments primarily discussed above, the deformable electrode is schematically represented as abutting generally planar surfaces of the displacement element and frame element. However, in some implementations the displacement element and/or the frame element may be provided with a groove/recess in which the deformable electrode may be received. This may be provided, for example, to help with locating the deformable electrode. Furthermore, such a groove may be used to help constrain the side-wards expansion of the deformable electrode during compression. It will be appreciated that whilst the above-described embodiments have focused on displacement sensing in the context of providing a user interface, the same principles can be applied more generally wherever there is a desire to measure the displacement of one object relative to another. For example, principles similar to those described above may be used for general switching/displacement indication applications, and furthermore, it will be appreciated the displacement may not be due to activation by a user. For example, in some implementations the same techniques can be used to measure whether one component of an apparatus has moved relative to another component. In the most general sense, it will be appreciated the reasons why a displacement is being measured in any given implementation, and any actions taken in response whether or not a displacement is measured, are not significant to the principles described herein.

It will be further appreciated that while specific materials and dimensions for various elements have been provided by way of specific example, in general the materials and overall geometry of the elements comprising the displacement sensor may be selected according to the application at hand, example accords with a large or small area displacement sensor is desired. The exact arrangement adopted for any specific information may be determined empirically, for example by testing the response of different configurations and selecting a configuration providing a desired response (for example in terms of sensitivity/rejection of spurious displacement detections). It will be further realized that while the above descriptions have focussed on a generally planar displacement element 3, the principles described herein are equally applicable to non-planar structures. For example, the same principles could be used to sense displacement on a touch sensitive system that incorporates a curved outer surface.

Thus there has been described a displacement sensor for sensing a change in separation between a first element and a second element along a displacement direction. The sensor comprises a reference electrode mounted to the second element in the form of a conductive trace on a surface of the second element facing the first element. A deformable electrode, e.g. a conductive elastomeric material, is arranged between the first element and the second element so as to overlie the reference electrode. The deformable electrode has a contact surface facing the reference electrode and insulated therefrom. At least part of the contact surface is inclined relative to an opposing surface of the reference electrode such that when the deformable electrode is compressed along the displacement direction there is a reduction in volume between the contact surface and the opposing surface of the reference electrode, thereby changing the capacitive coupling between them. The sensor further comprises a controller element configured to measure a characteristic of the capacitive coupling between the reference electrode and the deformable electrode and to determine if a change in separation between the first element and the second element has occurred by determining if there is a change in the characteristic of capacitive coupling between the reference electrode and the deformable electrode.

Accordingly, some aspects of some example displacement sensing apparatus and methods according to some embodiments may be summarised as follows.

A displacement sensor that can be integrated with various touch panel structures or with any surface that is to be made reactive to displacement by the application of a load. The system may use a deformable conductive element with a shape chosen so that small mechanical displacements at one surface produce comparatively large changes in the overlap region of that element with an insulated electrode.

The system uses two electrodes to measure the relative displacement between two rigid or semi-rigid surfaces (elements).

The first electrode is a substantially conductive deformable strip. The strip is affixed by one of its faces to the inside of the first surface by way of adhesive or by some mechanical means. The second face of the deformable electrode is arranged to sit on top of the second electrode (or an arrangement of electrodes) formed on a substrate or embedded in a carrying medium. This second electrode is arranged to be affixed to the inside of the second surface. Thus, in cross section, a sandwich is formed which comprises (in vertical order and lying approximately in vertical alignment with each other): (i) the first surface; (ii) the deformable conductive element; (iii) the second electrode (electrode array); and (iv) the second surface.

The two surfaces may be held apart by a compliant gasket (foam, plastic or other compressible medium etc.) with the first and second electrodes sitting along-side this gasket and together being of equal or slightly thicker overall height compared to the gasket in its uncompressed state (hence biasing the deformable electrode slightly into compression when the gasket is bonded between the surfaces). Alternatively the two surfaces could be mounted to one another with appropriate bonding between the surfaces and the first and second electrodes. In such cases, the electrode may be provided with relatively large flat areas for improved bonding.

The electrode array (second electrode) and deformable electrode are arranged as elongated structures allowing them to be placed around a substantial part of the periphery of the surfaces.

The electrode array uses a substantially conductive trace or wire (the sensing electrode) that has a thin insulating coating to prevent it forming a direct contact with the conductive deformable electrode. The deformable electrode is shaped in such a way that when a force is applied to one of the surfaces, the resulting compressive load causes the electrode to deform and its area of overlap with the electrode array to increase. The deformable electrode may be either grounded, allowing this change in area to manifest as a change in the self-capacitance of the sensing electrode, or the deformable electrode may be driven with an excitation waveform so that its change in mutual capacitance to the sensing electrode may be detected.

The electrode array may beneficially include an extra "shield" electrode running under and/or around the main sensing electrode, such that by driving this shield electrode with an appropriate waveform, the parasitic capacitance of said sensing electrode will be reduced allowing easier measurement of the relatively small changes in capacitance caused during displacement of the surfaces.

Additionally, the electrode array may have one or more exposed regions of a third electrode that serves to make direct contact to the deformable electrode, hence causing the deformable electrode to be connected to a steady potential (including ground) or to a drive waveform. Alternatively the deformable electrode may be connected to such potentials or drive waveforms by other means, such as soldered joints, inserted "drain" wires etc.

Any of the electrodes may be divided into two or more interconnected sub-sections (the interconnection being either made locally to the electrodes or at some point away from the electrodes, perhaps back on a connected circuit board or connector for example).

The second electrode may be shaped in such a way to maximise a range of overlap with the deformable electrode as the two surface change relative position, for example the electrode may be in the form of a zig-zag trace, or a linked set of diamond shapes. By so doing, the overall capacitance of the sensing (second) electrode can be minimized (compared to just using a wide plain strip trace), whilst achieving a wider range of operation as the deformable electrode squashes down onto the surface.

The electrode array (second electrode) could be fabricated using a PCB, flex PCB, cable assembly, or wires embedded in a carrier. It may in some cases be advantageous for the second electrode to be flexible so it can be formed continuously around corners.

The deformable electrode could potentially adopt any of many different shapes. In some cases it may be helpful if the face that overlaps the sensing electrode does so with a relatively shallow (but non-zero, for example greater than 5 degrees) angle of incidence, for example, at an angle less than 45 degrees, such as an angle less than 40 degrees, less than 35 degrees, less than 30 degrees, less than 25 degrees, less than 20 degrees, less than 15 degrees, less than 10 degrees. This can help mean that a small vertical displacement is translated to a relatively large change in overlap area by virtue. It may also include "side walls" that run substantially vertically so that a small vertical displacement is transmitted in a direct way to the inclined surface(s) (between the deformable electrode and sensing electrode) so causing the desired change in surface area.

The deformable electrode could be made from conductive elastomer, conductive foam or other similar material having suitable characteristics. Alternatively it could be made from a flexible woven conductive fabric or a continuous conductive foil, either of which could be folded to make it the desired shape and desired level of compliance, or such materials could surround a core of air, or a flexible foam or elastomer (which in this case could be either conductive or not as the outer sheath provides the electrical conductivity).

By arranging the electrode array around the periphery of the surfaces the total change in the volume of space between the first and second surfaces will be approximately constant regardless of the point of application of the load on the upper surface; applied in the centre of the first surface there will be an approximately equal but small reduction in separation all around the periphery, whereas applied near the edge there will a non-uniform displacement with larger reductions in separation local to the load and smaller reductions farther from the load. However, overall it can be expected that the overall change in the integrated capacitive coupling between the two electrodes will be broadly the same.

To sense the displacement, a measurement circuit is coupled to the electrodes. The sense (second) electrode is coupled to a Capacitance to Digital (C-to-D) converter, which may be of any known form. The circuit may use either a "self-capacitance" or "mutual capacitance" method to undertake the measurement. A self-capacitance measurement may in some cases be preferred as the nature of the electric fields formed between the sense electrode and the deformable electrode (connected either to 0V or to "ground"/"earth") is such that it will tend to maximise the change in electrical capacitance as a function of displacement. Connecting the deformable electrode to Ground or a DC potential can also be advantageous in some circumstances because it can help reduce the risk of adverse EMI emissions or susceptibility. Another advantage to this approach is that if the deformable electrode is arranged to face "outwards" relative to the sense electrode, the deformable electrode can help to shield the sense electrode from external capacitive influences, such as a user's finger adjacent to (but not pressing) on the displacement sensor.

In the case of a self-capacitance measurement system, an optional shield electrode may be connected to a drive circuit to use the established technique of "guarding". This approach applies an electrical stimulus to the shield electrode which substantially matches that used to measure the capacitance of the sense electrode. This has the effect of electrically "hiding" any parasitic capacitance to ground if the shield electrode is placed between the sense electrode and any grounded structure behind it. This would be advantageous where the sensing electrode needs to be mounted directly over the top of a grounded metallic frame (which could be the second surface in this case)

In the case of a mutual capacitance measurement system, the deformable electrode would preferably carry the excitation drive waveform to cause charge to flow in and out of the sense electrode. Changes in displacement would then cause the amount of this charge to be changed, and hence cause a measureable change in coupling between the two.

The measurement system includes a microprocessor or suitable processing logic, to allow it to filter and adjust the raw measurements from the capacitive sensor. This processing function may include calibration to store a displacement "baseline" at initial power-on or on reset/host command. It may also include measurement trimming to compensate for environmental changes that affect the sensor's raw signals, making them drift over time.

The measurement system also includes a host interface to allow it to transmit the final displacement measurement/determination to a coupled processing system. The host may therefore determine the absolute or relative displacement of the sensor and use this as either a primary measurement for control of some function, or it may use it use it to augment some secondary function. For example, in a touch panel system, it may use the displacement measurement to help determine a user's intention when making selections; the user's touched coordinate coming from a touch controller and electrode array in the middle region of the sensor, and the displacement coming from the peripheral electrodes as described, coupled with the described measurement system.

The controller element/measurement system may be configured to make measurements of the relevant capacitive characteristic of the electrodes at an appropriate sampling rate having regard to the timescales on which the displacement is to be measured are expected to occur. For example, in the case of a user interface the sampling rate may correspond with that typically used for user input devices (e.g. corresponding to the rate at which the state of a mouse click button would be sampled). The displacement sensor could also be used for other applications, for example to measure the rate at which something is vibrating, and in this case a sampling period according to the expected vibration rates may be chosen, for example allowing for the sensing of displacements varying in time with frequency components up to a few 100 Hz. In some cases, it may the controller element/measurement system may be configured to adopt an approach of measuring capacitance (and hence displacement) using an AC coupled system, meaning that the C-to-D converter does not directly measure a static displacement. However by appropriate post processing, either in the measurement system's microprocessor, or in the host system, a static (DC) element to the displacement between the sending element and frame can be approximated, e.g. through integration of measurements obtained over time.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Capacitive Sensors: Design and Applications by Larry K. Baxter, Aug. 1996, Wiley-IEEE Press, ISBN: 978-0-7803-5351-0

What is claimed is:

1. A displacement sensor for sensing a displacement between a first element and a second element along a displacement direction, the displacement sensor comprising:
    a reference electrode mounted to the second element; and
    a deformable electrode arranged between the first element and the second element, wherein
    the first element is movably mounted relative to the second element; wherein the first element is transparent or opaque and is formed of a glass, plastic or other non-conductive material;
    the second element configured to provide a structural support for the first element and define a recess into which the first element is received and moveably supported therein by a support element arranged around a peripheral part of the first element, wherein an upper edge of the support element is bonded to the underside of the first element and a lower edge of the support element is bonded to the second element;
    wherein the deformable electrode has a contact surface facing the reference electrode and insulated therefrom by an insulator layer, and wherein at least part of the contact surface is inclined relative to an opposing surface of the reference electrode such that when the deformable electrode is compressed along the displacement direction there is a reduction in volume between the contact surface and the opposing surface of the reference electrode; and wherein
    the sensor further comprises:
    a controller element configured to measure a characteristic of capacitive coupling associated with the reference electrode and the deformable electrode and to determine a displacement between the first element and the second element from the measured characteristic of capacitive coupling.

2. The displacement sensor of claim 1, wherein the inclination of the at least part of the contact surface relative to the opposing surface of the reference electrode is provided by virtue of at least a portion of one of the contact surface and the opposing surface comprising a curved surface.

3. The displacement sensor of claim 1, wherein the deformable electrode is in the form of a strip having side walls which are parallel to the displacement direction.

4. The displacement sensor of claim 1, wherein the contact surface of the deformable electrode comprises a contact portion and the deformable electrode is arranged so there is no air gap along the displacement direction between the second element and the contact portion when the displacement sensor is in its rest state with no displacement load applied.

5. The displacement sensor of claim 4, wherein the contact portion is in alignment with the reference electrode along the displacement direction, or wherein the contact portion is in alignment with a contact electrode mounted to the second element along the displacement direction so as to establish an electrical connection between the contact electrode the deformable electrode, or wherein the contact portion is in a middle region of the contact surface.

6. The displacement sensor of claim 1, wherein the deformable electrode is sized so as to be in compression between the first element and the second element when the displacement sensor is in its rest state with no displacement load applied.

7. The displacement sensor of claim 1, wherein the contact surface of the deformable electrode is inclined relative to the opposing surface of the reference electrode by an angle that is greater than 5 degrees and less than an angle selected from the group comprising 45 degrees, 40 degrees, 35 degrees, 30 degrees, 25 degrees, 20 degrees, 15 degrees and 10 degrees.

8. The displacement sensor of claim 1, wherein the insulator layer is provided by a surface layer on at least one of the contact surface of the deformable electrode and the opposing surface of the reference electrode.

9. The displacement sensor of claim 1, wherein the deformable electrode comprises a conductive foam material or a sprung metallic material or a flexible conductive sheath surrounding a deformable core.

10. The displacement sensor of claim 1, wherein the reference electrode comprises a conductive trace mounted to the second element.

11. The displacement sensor of claim 10, wherein the conductive trace is provided on a flexible substrate mounted to the second element.

12. The displacement sensor of claim 1, wherein the opposing surface of the reference electrode facing the deformable electrode is arranged in a varying pattern along a direction that is parallel to an axis of extent of the deformable electrode which is orthogonal to the displacement direction.

13. The displacement sensor of claim 12, wherein the varying pattern comprises a zigzag pattern or a pattern of regions that vary in width in a direction orthogonal to the axis of extent of the deformable electrode and the displacement direction.

14. The displacement sensor of claim 1, wherein the reference electrode and the deformable electrode are aligned with a path running around a peripheral region of the first element.

15. The displacement sensor of claim 1, wherein the reference electrode and the deformable electrode form a closed path.

16. The displacement sensor of claim 1, wherein the first element is movably mounted to the second element using the support member, wherein the support member is a resiliently compressible support element.

17. The displacement sensor of claim 16, wherein the resiliently compressible support element is provided by the deformable electrode.

18. The displacement sensor of claim 16, wherein the resiliently compressible support element extends around a peripheral region of the first element to provide a seal for the displacement sensor.

19. The displacement sensor of claim 1, wherein the capacitive coupling for which a characteristic is measured by the controller element is a self-capacitance of one of the deformable electrode and the reference electrode while the other one of the deformable electrode and the reference electrode is connected to a reference potential, or wherein the capacitive coupling for which a characteristic is measured by the controller element is a mutual-capacitance between the deformable electrode and the reference electrode, or wherein one of the deformable electrode or the reference electrode comprises a first electrode part and a second electrode part, and wherein the capacitive coupling for which a characteristic is measured by the controller element is a mutual-capacitance between the first electrode part and the second electrode part while the other one of the deformable electrode and the reference electrode is connected to a reference potential.

20. The displacement sensor of claim 1, wherein the controller element is further configured to generate an output signal to indicate when it determines there has been a displacement of the first element relative to the reference electrode.

21. The displacement sensor of claim 1, wherein the controller element is configured to determine there has been a displacement of the first element relative to the reference electrode by comparing a difference between two measurements of the characteristic of capacitive coupling with a trigger threshold.

22. The displacement sensor of claim 1, further comprising a position-sensitive capacitive touch sensor having an electrode pattern defining a sensitive area for the position-sensitive capacitive touch sensor on the first element.

23. The displacement sensor of claim 1, further comprising a housing of a device in which the displacement sensor is incorporated.

24. A method of sensing a displacement between a first element and a second element along a displacement direction, the method comprising:
providing a displacement sensor comprising:
a reference electrode mounted to the second element; and
a deformable electrode arranged between the first element and the second element, wherein
the first element is movably mounted relative to the second element; wherein the first element is transparent or opaque and is formed of a glass, plastic or other non-conductive material;
the second element configured to provide a structural support for the first element and define a recess into which the first element is received and moveably supported therein by a support element arranged around a peripheral part of the first element, wherein an upper edge of the support element is bonded to the underside of the first element and a lower edge of the support element is bonded to the second element;
wherein the deformable electrode has a contact surface facing the reference electrode and insulated therefrom by an insulator layer, and wherein at least part of the contact surface is inclined relative to an opposing surface of the reference electrode such that when the deformable electrode is compressed along the displacement direction there is a reduction in volume between the contact surface and the opposing surface of the reference electrode; and wherein the sensor further comprises:

a controller element for measuring a characteristic of capacitive coupling associated with the reference electrode and the deformable electrode; and determining a displacement between the first element and the second element from the measured characteristic of capacitive coupling.

* * * * *